United States Patent
Multerer

(10) Patent No.: US 12,332,105 B2
(45) Date of Patent: Jun. 17, 2025

(54) DEVICE AND METHOD FOR MEASURING THE FILL LEVEL IN A TANK FOR A VEHICLE, TANK PROVIDED THEREWITH, VEHICLE, AND PRODUCTION METHOD

(71) Applicant: Airbus (S.A.S.), Blagnac (FR)

(72) Inventor: Thomas Multerer, Taufkirchen (DE)

(73) Assignee: Airbus (S.A.S.), Blagnac (FR)

( * ) Notice: Subject to any disclaimer, the term of this patent is extended or adjusted under 35 U.S.C. 154(b) by 434 days.

(21) Appl. No.: 17/864,890

(22) Filed: Jul. 14, 2022

(65) Prior Publication Data
US 2023/0013556 A1    Jan. 19, 2023

(30) Foreign Application Priority Data

Jul. 16, 2021   (EP) .................................. 21186055

(51) Int. Cl.
*G01F 23/284*   (2006.01)
(52) U.S. Cl.
CPC .................. *G01F 23/284* (2013.01)
(58) Field of Classification Search
CPC .................................................... G01F 23/284
See application file for complete search history.

(56) References Cited

U.S. PATENT DOCUMENTS

2002/0059828 A1* 5/2002 Muller ..................... G01S 15/88
  73/290 R
2008/0272968 A1* 11/2008 Muller ................... G01F 23/284
  343/703
2008/0297403 A1* 12/2008 Akerstrom ............ G01F 23/284
  342/175

(Continued)

FOREIGN PATENT DOCUMENTS

DE    10 2012 109101 A1    3/2014
EP    2 827 606 A2    1/2015
WO    WO 2021/044112 A2    3/2021

OTHER PUBLICATIONS

Da Costa IF et al, "Tri-band slotted waveguide antenna array for millimetric-waves applications," The 8th European Conference on Antennas and Propagation (EUCAP 2014), European Association on Antennas and Propagation, Apr. 6, 2014, Seiten.

(Continued)

*Primary Examiner* — Marcus E Windrich
(74) *Attorney, Agent, or Firm* — KDW Firm PLLC

(57) ABSTRACT

A fill level measuring device for measuring the fill level of a liquid in a tank of a vehicle includes a multiband slotted waveguide antenna to be attached in the upper region of the tank, the antenna having a waveguide and multiple slots spaced apart, which are dimensioned differently, so that they have different resonance frequencies, to respectively emit radar waves having different frequencies. At least one radar transmitter can be coupled to the waveguide to feed the multiband slotted waveguide antenna with radar waves having the different resonance frequencies, and at least one radar receiver is provided for receiving reflected radar waves of different frequencies via the multiband slotted waveguide antenna. An evaluation unit is provided for detecting the fill level and the spatial distribution of the liquid in the tank based on the reflected radar waves.

11 Claims, 2 Drawing Sheets

(56) References Cited

U.S. PATENT DOCUMENTS

2012/0158321 A1* 6/2012 Bommer .............. G01F 23/806
  702/55
2015/0253177 A1* 9/2015 Blodt .................... G01F 23/284
  324/644

OTHER PUBLICATIONS

Da Costa IF et al, "Optically Controlled Reconfigurable Antenna Array for mm-Wave Applications," IEEE Antennas and Wireless Propagation Letters, Bd. 16, May 2, 2017, Seiten.
European Search Report for Application No. 21186055 dated Dec. 15, 2021.

* cited by examiner

DEVICE AND METHOD FOR MEASURING THE FILL LEVEL IN A TANK FOR A VEHICLE, TANK PROVIDED THEREWITH, VEHICLE, AND PRODUCTION METHOD

CROSS-REFERENCE TO RELATED APPLICATION

This application claims priority to EP 21186055.6 filed Jul. 16, 2021, the entire disclosure of which is incorporated by reference herein.

TECHNICAL FIELD

The disclosure herein relates to a fill level measuring device for measuring the fill level of a liquid in a tank of a vehicle. Furthermore, the disclosure herein relates to a tank for a vehicle and a corresponding vehicle provided with a tank, in particular an aircraft, for example, an airplane. Furthermore, the disclosure herein relates to a production method for producing an element of the fill level measuring device to be arranged in the tank. Finally, the disclosure herein relates to a fill level measuring method for measuring the fill level of a liquid in the tank of a vehicle.

BACKGROUND

There are different measuring methods and measuring devices for fill level measurement. An overview of the presently known methods available on the market is reflected in citation [1]:

[1] Füllstandsmessung [fill level measurement]—Wikipedia. Downloaded from the Internet under the link https://de.wikipedia.org/wiki/Füllsatndmessung on Sep. 7, 2021. According to this, fill level measurement by radar, wherein radar waves are emitted by an antenna onto the liquid and the fill level is ascertained from the time-of-flight of the radar wave reflected at the liquid surface, is fundamentally known.

In citation [2]:

[2] "Auswahlkriterien für Radarsysteme zur Füllstandmessung in der Chemischen Industrie [selection criteria for radar systems for fill level measurement in the chemical industry]", Michael J. Heim and Andreas Mayr, ATP Automatisierungstechnische Praxis 2/2001, February 2001, the fundamental elements of a radar fill level measuring device and criteria for its design are compiled.

SUMMARY

The disclosure herein is directed in particular to a fill level measurement for tanks of modern more environmentally-friendly vehicles, in particular aircraft, which are to be operated using CO2-saving fuels, in particular hydrogen, for example. In particular in the case of aircraft, the most accurate possible determination of the fill quantity of fuel is very desirable.

The disclosure herein has an object of providing devices and methods which enable a more accurate fill level measurement in tanks in vehicles, in particular aircraft, even with newer fuel media.

To achieve this object, the disclosure herein provides a fill level measuring device and a fill level measuring method. Advantageous uses and a production method of an antenna of the fill level measuring device are disclosed herein.

The disclosure herein provides, according to a first aspect thereof, a fill level measuring device for measuring the fill level of a liquid in a tank of a vehicle, comprising at least one multi-wavelength slot antenna to be attached in the upper region of the tank, which antenna has a waveguide and multiple slots spaced apart on the waveguide, which are dimensioned differently, so that they have different resonance frequencies in order to respectively emit radar waves having different wavelengths, a radar transmitter that can be coupled to the waveguide to feed the multi-wavelength slot antenna with radar waves having the different resonance frequencies, a radar receiver for receiving reflected radar waves of different frequencies via the multi-wavelength slot antenna, and an evaluation unit for detecting the fill level and the spatial distribution of the liquid in the tank on the basis of the reflected radar waves.

It is preferred that the waveguide is a rectangular tube having a row of slots therein.

It is preferred that the evaluation unit is designed to determine the amount of liquid in the tank from the fill level and the spatial distribution.

It is preferred that at least one first and one second multiband slotted waveguide antenna to be attached at a distance to one another in the upper region of the tank are provided, each of which has the waveguide and the multiple slots arranged spaced apart on the waveguide, wherein the fill level measuring device is designed to detect the spatial distribution of the liquid on the basis of radar waves transmitted and received by the first and second multiband slotted waveguide antenna.

Preferably, a plurality of the multiband slotted waveguide antennas, which each have the waveguide and the differently dimensioned slots provided spaced apart therein with spacing in a first direction, are arranged spaced apart in relation to one another in a second direction. A separate radar transmitter and a separate radar receiver can respectively be provided per antenna, wherein the evaluation is carried out on the basis of the signals of the radar receivers. However, depending on the type of radar used, it is also possible to couple one transmitter and one receiver to the multiple antennas and to assign the signals from the different antennas in another manner—different frequencies, different transmitting and receiving times, etc.

A measurement of the spatial distribution over multiple axes is thus possible.

A plurality of the fill level measuring devices can also be used in parallel at a distance to one another, in order to expand the measurement onto two axes.

This is advantageous in particular for vehicles and more particularly for aircraft such as airplanes, since the vehicle can move around different axes. For example, an airplane has certain pitch and roll axis angles during the flight. In addition, dynamic effects such as acceleration, deceleration, vibrations, flight, or travel along a curve, etc. can also form the profile of the surface of the liquid very differently even in a short time. Nonetheless, an accurate detection of fill level and spatial distribution and thus also a more accurate detection of the fill quantity may be achieved in real time using such a multiaxis measuring system.

According to a further aspect, the disclosure herein provides a tank for a vehicle, comprising a fill level measuring device, wherein the multi-wavelength slot antenna is arranged in the upper region in the interior of a tank container and wherein the radar transmitter and the radar receiver and the evaluation unit are arranged outside the tank container.

It is preferred that the tank container is formed from metal and/or from composite material.

It is preferred that the tank is a liquid gas tank for liquid gas, in particular liquid hydrogen.

It is preferred that the tank is an airplane tank.

According to a further aspect, the disclosure herein provides a vehicle, in particular an aircraft, more particularly an airplane, comprising a tank.

According to a further aspect, the disclosure herein provides a method for producing a multi-wavelength slot antenna for a fill level measuring device, comprising ascertaining the dimensions of the slots by a 3D-EM simulation tool, and providing a waveguide formed from a metal profile or metal tube with the correspondingly dimensioned slots.

According to still a further aspect, the disclosure herein provides a method for measuring the fill level of a tank in a vehicle, in particular an aircraft, comprising providing a multi-wavelength slot antenna in an upper region of the tank, wherein the multi-wavelength slot antenna has a waveguide and multiple slots arranged spaced apart on the waveguide, which are dimensioned differently so that they have different resonance frequencies, coupling radar waves having the different resonance frequencies on the waveguide, so that radar waves having different resonance frequencies are emitted at different slots onto the surface of the liquid in the tank, receiving reflected radar waves of different frequencies by the multi-wavelength slot antenna and detecting the fill level and the spatial distribution of the liquid in the tank on the basis of the reflected radar waves.

It is preferred that the fill level and the spatial distribution of a liquid gas can be measured in a gas tank on board a vehicle.

It is preferred that the fill level and the spatial distribution of a liquid hydrogen are measured in a liquid hydrogen container on board an aircraft.

It is preferred that the fill quantity in the tank is ascertained from the fill level and the spatial distribution.

Example embodiments of the disclosure herein relate to a fill level measurement in LH2 tanks (liquid hydrogen tanks) using a multiband slotted waveguide radar.

Preferred embodiments of the disclosure herein enable a detection of liquid, in particular liquid hydrogen (also simply called LH2 hereinafter), in a simple and robust manner.

Preferred embodiments of the disclosure herein have in particular one or more of the following advantages:

they can measure the fill level they can measure the spatial distribution of liquid they are very robust, since the measurement sensor only consists of a tubular apparatus no active components are required in the tank no moving parts are required in the tank.

BRIEF DESCRIPTION OF THE DRAWINGS

An example embodiment is explained in more detail hereinafter on the basis of the appended drawings. In the figures.

DETAILED DESCRIPTION

Figure 1:
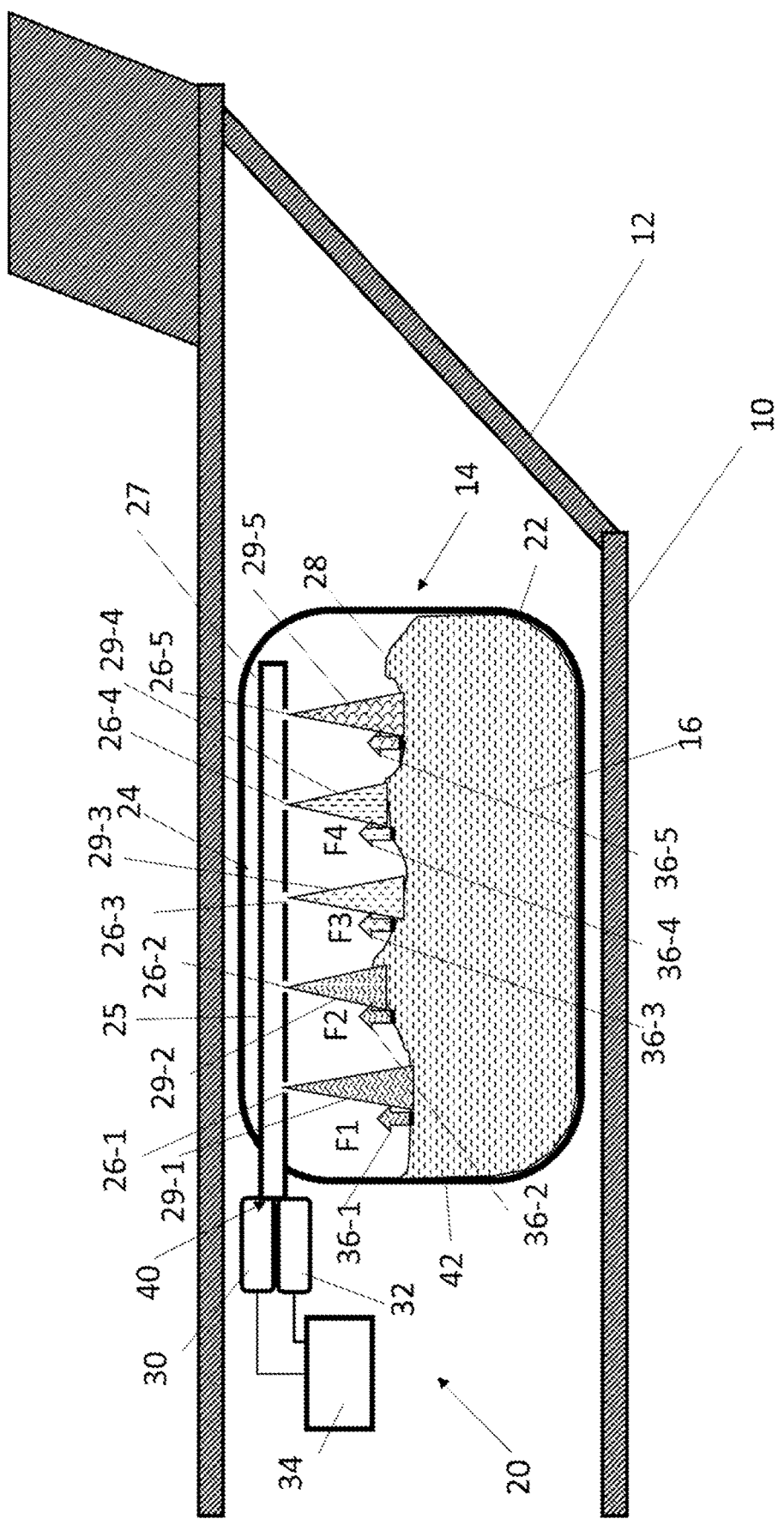
FIG. 1 shows a schematic block diagram of a vehicle in the form of an airplane having a tank and a fill level measuring device according to one example embodiment of the disclosure herein.
Figure 3:
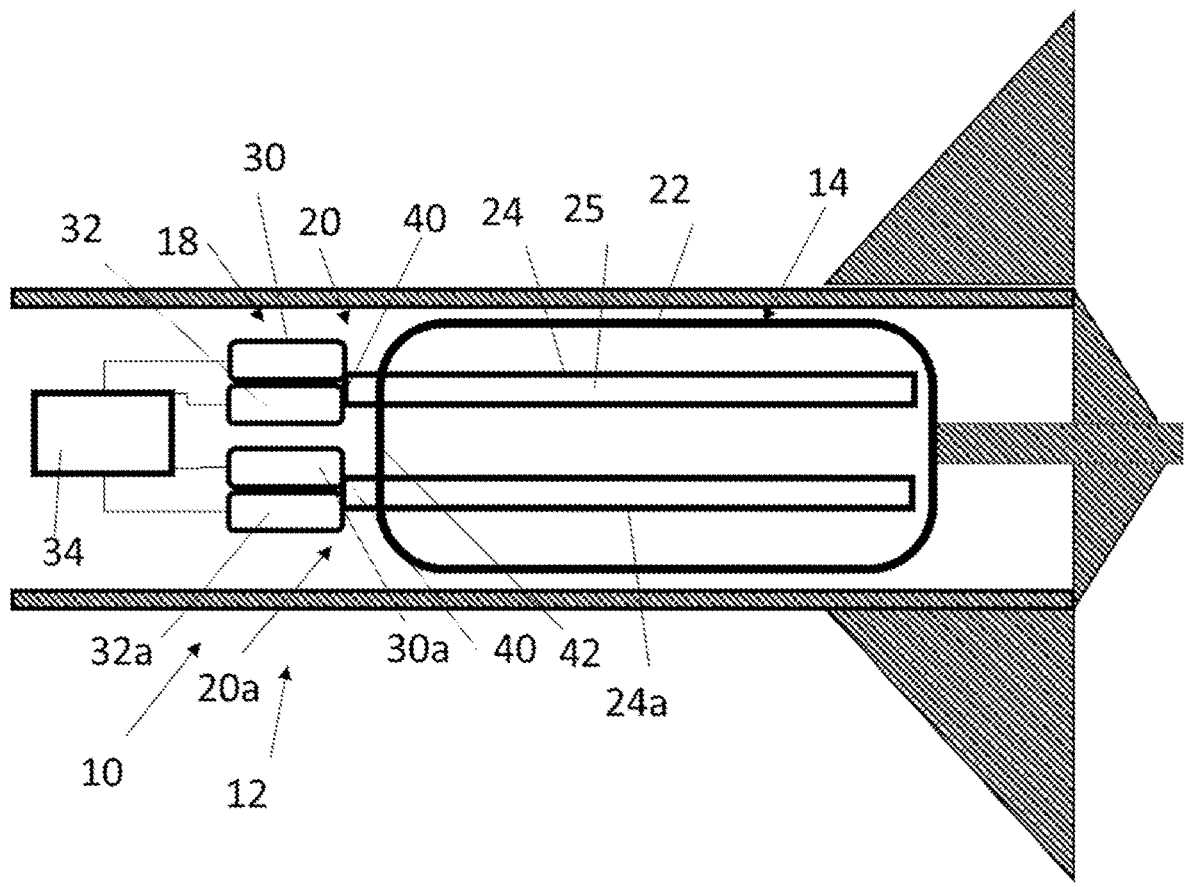
FIG. 3 shows a schematic block diagram of the vehicle from FIG. 1 in a top view.

FIGS. 1 and 3 schematically show a vehicle 10 in the form of an airplane 12 as an example of an aircraft. The airplane 12 is provided with a tank 14 for fuel. The airplane 12 is designed as a zero-emission airplane and is operated using hydrogen 16. Accordingly, the tank 14 is designed as a liquid hydrogen tank.

The tank 14 is designed having at least one fill level measuring device 18 for detecting liquid hydrogen 16. In other uses, the fill level measuring device 18 can be designed in general for detecting liquids. In the preferred use illustrated here, the fill level measuring device 18 is designed for measuring a fill quantity in liquid hydrogen tanks (LH2 tanks) 14.

Special measurement conditions exist in the detection of LH2 (liquid hydrogen 16)—in particular in aircraft:

extremely cold temperatures of the liquid hydrogen 16 (<20K)

high reliability—the tank 14 is intended not to be opened for a long time, in particular more than 10 years on the one hand, vacuum on the other hand, high pressure is possible.

This makes many of the measurement methods listed in in [1] unsuitable.

The fill level measuring device 18 is designed as a radar system 20 to measure the fill levels. The radar system 20 is used to measure liquid hydrogen 16 in a tank container 21 made of metal or composite material.

As FIG. 1 shows, at least one multiband slotted waveguide antenna 24 is installed in the upper region of the tank 14, more precisely at the upper end region of the tank container 22 designed for liquid hydrogen.

Furthermore, the radar system 20 has a radar transmitter 30, a radar receiver 32, and an evaluation unit 34. The radar transmitter 30 is designed to transmit multiband radar waves having different frequencies F1-F5 and to couple the waves on the waveguide 25 of the antenna 24. The radar receiver 32 is coupled to the waveguide to receive reflected radar waves through the waveguide 25. The evaluation unit 34 is connected to the radar transmitter 30 and the radar receiver 32 in order to ascertain a distance between antenna 24 and liquid surface from the time difference between transmitted and received radar wave.

Figure 2:
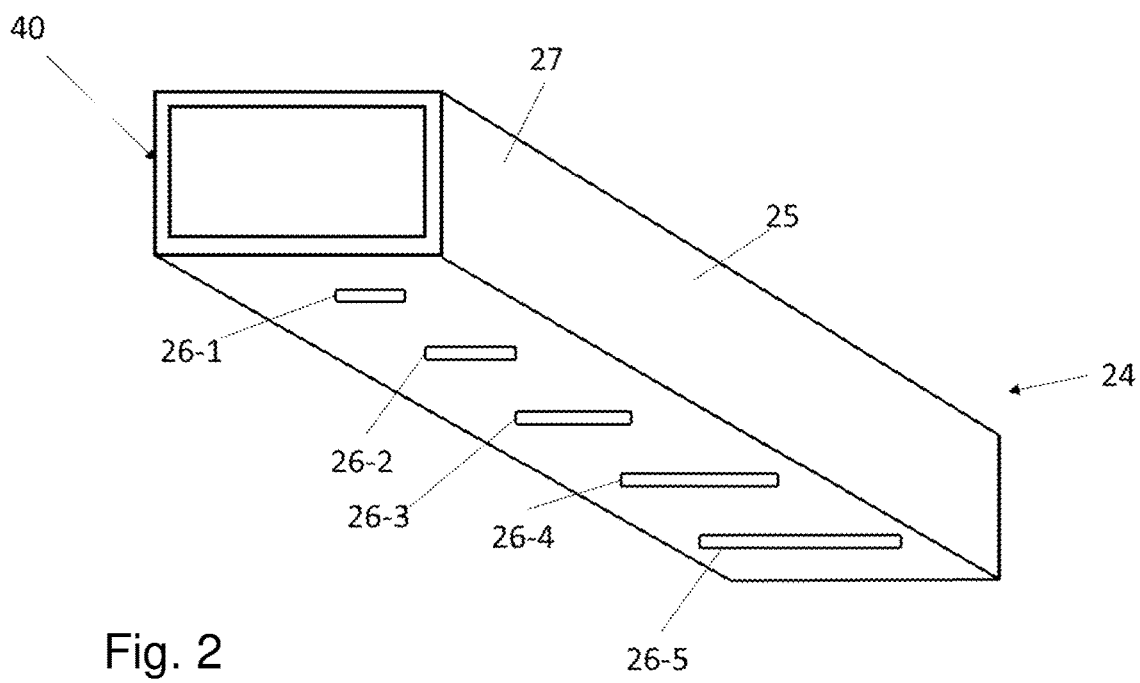
FIG. 2 shows a schematic illustration of a radar antenna of the fill level measuring device according to FIG. 1.

FIG. 2 shows a schematic perspective view of the multiband slotted waveguide antenna 24. As shown in FIG. 1 and FIG. 2, the slotted waveguide antenna 24 has multiple slots 26-1 to 26-5, which operate at different frequencies F1-F5 (multiband). The spatial profile 28 of the liquid can thus be obtained. As can be inferred from FIG. 2, the actual antenna 24 looks like a (rectangular) tube 27 having several small cutouts to form the slots 26-1-26-5.

To produce the antenna 24, the dimensions of the cutouts are simulated beforehand in a 3D-EM simulation tool (software for simulating electromagnetic components, available from different suppliers on the market), in order to obtain the optimum position and dimensions for each slot 26-1, 26-2, 26-3, 26-4, 26-5 for the tank 14, the possible usable frequencies, and the desired resolution.

As FIG. 2 shows, the dimensions of the slots 26-1-26-5 are all different.

Each slot 26-1-26-5 is resonant at (slightly) different frequencies F1-F5. This means that—as indicated in FIG.

1—radar waves 29-1-29-5 of different frequencies F1-F5 exit from the different slots 26-1-26-5.

The radar waves 29-1-29-5 excited by the slots 26-1-26-5 are reflected from the medium to be measured, for example LH2 16 here, and are radiated back to the antenna 24, as indicated by the arrows 36-1-36-5.

The reflected energy 36-1-36-5 is conducted via the waveguide to the external radar receiver 32. This evaluates the time difference separated according to frequency F1 to F5 and can thus ascertain the distance of the liquid surface from each of the slots 26-1 to 26-5, to thus ascertain the spatial profile 28 of the liquid hydrogen 14 in the tank 14. On the basis of the known geometry of the tank 14, the liquid volume of the LH2 in the tank 14 and thus the amount of LH2 fuel may be ascertained on the basis of the spatial distribution of the surface thus detected. Therefore, a reliable determination of the current LH2 amount may be achieved even in the event of surface distribution which is very disturbed and changes continuously due to turbulence, for example.

As can be inferred from FIG. 3, in the illustrated embodiment a first multiband slotted waveguide antenna 24 and at least one second multiband slotted waveguide antenna 24a are provided with spacing in parallel to one another. The first multiband slotted waveguide antenna 24 is coupled to the first radar transmitter 30 and the first radar receiver 32a. The second multiband slotted waveguide antenna 24a is coupled to a second radar transmitter 30 and a second radar receiver 32a and thus forms a second radar system 20a, which is constructed and functions precisely like the above-described radar system 20. The evaluation unit 34 is designed to detect the profile 28 in two axes—longitudinal direction of the waveguide 25 and direction transverse thereto—from the signals of the two radar systems 20, 20a.

The approach described here for the fill level measurement and detection of spatial distribution functions independently of the radar signal used (this can be FMCW, pulse signal, or something else).

The technology is very robust, since the only thing which is to be installed in the tank 14 is a metal tube 27. Such metal tubes are often typically provided in any case already in a tank 14 of the type under discussion here.

Furthermore, the technology enables a feedthrough 40 to be implemented on the side of the tank 14, which is more advantageous in comparison to the implementation on the tank wall 42. The tank 14 is positioned horizontally in the application shown here.

The radar transmitter 30, 30a and the radar receiver 32, 32a are arranged outside the tank 14.

For further details on the construction of further fundamentally known elements (not described in greater detail here) of the radar system 20 for fill level measurements, reference is made to citations [1] and [2].

The subject matter disclosed herein can be implemented in or with software in combination with hardware and/or firmware. For example, the subject matter described herein can be implemented in or with software executed by a processor or processing unit. In one exemplary implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 vehicle
12 airplane
14 tank
16 hydrogen
18 fill level measuring device
20 radar system
20a second radar system
22 tank container
24 antenna
24a second antenna
25 waveguide
26-1 first slot
26-2 second slot
26-3 third slot
26-4 fourth slot
26-5 fifth slot
27 tube
28 spatial profile
29-1 radar wave having first frequency
29-2 radar wave having second frequency
29-3 radar wave having third frequency
29-4 radar wave having fourth frequency
29-5 radar wave having fifth frequency
30 radar transmitter
30a second radar transmitter
32 radar receiver
32a second radar receiver
34 evaluation unit
36-1 reflected radar wave having first frequency
36-2 reflected radar wave having second frequency
36-3 reflected radar wave having third frequency
36-4 reflected radar wave having fourth frequency
36-5 reflected radar wave having fifth frequency
40 feedthrough
42 tank wall
F1 first frequency
F2 second frequency
F3 third frequency
F4 fourth frequency
F5 fifth frequency

The invention claimed is:
1. A fill level measuring device for measuring a fill level of a liquid in a tank of a vehicle, comprising:

at least one first multiband slotted waveguide antenna and at least one second multiband slotted waveguide antenna to be attached in an upper region of the tank, each of the first and second multiband slotted waveguide antenna comprising a waveguide and multiple slots arranged spaced apart along a longitudinal direction of the waveguide, which are dimensioned differently, so that they have different resonance frequencies, to respectively emit radar waves having different frequencies;

at least one radar transmitter which can be coupled to the waveguide to feed the first and second multiband slotted waveguide antenna with radar waves having the different resonance frequencies; and at least one radar receiver for receiving reflected radar waves of different frequencies via the first and second multiband slotted waveguide antenna, and an evaluation unit for detecting the fill level and a spatial distribution of the liquid in the tank based on the reflected radar waves transmitted and received by the first and second multiband slotted waveguide antenna;

wherein the first and second multiband slotted waveguide antenna are spaced apart from one another in a direction transverse to the longitudinal direction; and wherein the evaluation unit is configured to detect the spatial distribution of the liquid in both the longitudinal direction of each of the first and second multiband slotted waveguide antenna and the direction transverse to the longitudinal direction.

2. The fill level measuring device of claim 1, wherein the waveguide is a metallic rectangular tube having a row of cutouts to form the slots.

3. The fill level measuring device of claim 1, wherein the evaluation unit is configured to determine an amount of liquid in the tank from the fill level and the spatial distribution.

4. A tank for a vehicle, comprising a fill level measuring device of claim 1, wherein the at least one first multiband slotted waveguide antenna and the at least one second multiband slotted waveguide antenna are in the upper region in an interior of a tank container and wherein the radar transmitter and the radar receiver and the evaluation unit are outside the tank container and are coupled to the waveguide.

5. The tank of claim 4,
wherein the tank container comprises metal and/or composite material, and/or
wherein the tank is a liquid gas tank for liquid gas, or for liquid hydrogen, and/or
wherein the tank is an airplane tank.

6. The tank of claim 4, comprising at least one first and one second liquid measuring device each fill level measuring device for measuring a fill level of a liquid in a tank of a vehicle and comprising:
at least one multiband slotted waveguide antenna to be attached in an upper region of the tank, the antenna comprising a waveguide and multiple slots arranged spaced apart on the waveguide, which are dimensioned differently, so that they have different resonance frequencies, to respectively emit radar waves having different frequencies;
at least one radar transmitter which can be coupled to the waveguide to feed the multiband slotted waveguide antenna with radar waves having the different resonance frequencies; and
at least one radar receiver for receiving reflected radar waves of different frequencies via the multiband slotted waveguide antenna, and an evaluation unit for detecting the fill level and a spatial distribution of the liquid in the tank based on the reflected radar waves; and
the antennas of which are arranged with spacing in relation to one another and are in parallel.

7. A vehicle or an aircraft, comprising a tank of claim 4.

8. A method for measuring a fill level of a tank in a vehicle or an aircraft, comprising:
providing at least one first multiband slotted waveguide antenna and at least one second multiband slotted waveguide antenna in an upper region of the tank, wherein each of the first and second multiband slotted waveguide antenna has a waveguide and multiple slots arranged spaced apart along a longitudinal direction of the waveguide, which are dimensioned differently so that they have different resonance frequencies, wherein the first and second multiband slotted waveguide antenna are spaced apart from one another in a direction transverse to the longitudinal direction;
coupling radar waves having the different resonance frequencies on each waveguide, so that radar waves having different frequencies are radiated at different slots onto a surface of liquid in the tank;
receiving reflected radar waves of different frequencies by the first and second multiband slotted waveguide antenna and detecting the fill level and a spatial distribution of the liquid in the tank based on the reflected radar waves transmitted and received by the first and second multiband slotted waveguide antenna;
wherein detecting the spatial distribution of the liquid in the tank comprises detecting the spatial distribution of the liquid in both the longitudinal direction of each of the first and second multiband slotted waveguide antenna and the direction transverse to the longitudinal direction.

9. The method of claim 8, wherein the fill level and the spatial distribution:
of a liquid gas in a gas tank on board the vehicle are measured; and/or
of a liquid hydrogen in a liquid hydrogen container on board an aircraft are measured.

10. The method of claim 8, wherein a fill quantity in the tank is ascertained from the fill level and the spatial distribution.

11. The method of claim 8, comprising using one or more fill level measuring device for measuring a fill level of a liquid in a tank of a vehicle, the fill level measuring device comprising:
at least one multiband slotted waveguide antenna to be attached in an upper region of the tank, the antenna comprising a waveguide and multiple slots arranged spaced apart on the waveguide, which are dimensioned differently, so that they have different resonance frequencies, to respectively emit radar waves having different frequencies;
at least one radar transmitter which can be coupled to the waveguide to feed the multiband slotted waveguide antenna with radar waves having the different resonance frequencies; and
at least one radar receiver for receiving reflected radar waves of different frequencies via the multiband slotted waveguide antenna, and an evaluation unit for detecting the fill level and a spatial distribution of the liquid in the tank based on the reflected radar waves.

* * * * *